US007602124B2

(12) United States Patent
Hur et al.

(10) Patent No.: US 7,602,124 B2
(45) Date of Patent: Oct. 13, 2009

(54) PLASMA DISPLAY PANEL (PDP) HAVING IMPROVED ELECTRODES STRUCTURE

(75) Inventors: Min Hur, Suwon-si (KR); Mizuta Takahisa, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 544 days.

(21) Appl. No.: 11/296,821

(22) Filed: Dec. 8, 2005

(65) Prior Publication Data

US 2006/0175974 A1 Aug. 10, 2006

(30) Foreign Application Priority Data

Feb. 4, 2005 (KR) ...................... 10-2005-0010333

(51) Int. Cl.
*H01J 17/49* (2006.01)
*G06F 3/038* (2006.01)
*H01J 1/62* (2006.01)

(52) U.S. Cl. ....................... 313/584; 313/581; 313/582; 313/585; 315/169.4

(58) Field of Classification Search ....................... None
See application file for complete search history.

(56) References Cited

U.S. PATENT DOCUMENTS 5,124,615 A * 6/1992 Kim ........................... 313/485
5,541,618 A 7/1996 Shinoda
5,661,500 A 8/1997 Shinoda et al.
5,663,741 A 9/1997 Kanazawa
5,674,553 A 10/1997 Shinoda et al.
5,724,054 A 3/1998 Shinoda
5,747,939 A * 5/1998 Kim et al. ................ 315/169.4
5,786,794 A 7/1998 Kishi et al.
5,952,782 A 9/1999 Nanto (Continued)

FOREIGN PATENT DOCUMENTS

CN 1502114 6/2004

(Continued)

OTHER PUBLICATIONS

"*Final Draft International Standard*", Project No. 47C/61988-1/Ed. 1; Plasma Display Panels—Part 1: Terminology and letter symbols, published by International Electrotechnical Commission, IEC. in 2003, and Appendix A—Description of Technology, Annex B—Relationship Between Voltage Terms And Discharge Characteristics; Annex C—Gaps and Annex D—Manufacturing.

*Primary Examiner*—Sikha Roy
*Assistant Examiner*—Tracie Green
(74) *Attorney, Agent, or Firm*—Robert E. Bushnell, Esq.

(57) ABSTRACT

A Plasma Display Panel (PDP) having enhanced efficiency includes: first and second substrates arranged facing each other and defining a space therebetween partitioned into at least one discharge cell; a phosphor layer arranged in the at least one discharge cell; an address electrode arranged along a first direction in the space between the first and second substrates; and first and second electrodes electrically insulated from the address electrode and arranged along a second direction crossing the first direction at opposite sides of each of the at least one discharge cells in the space between the first and second substrates. At least one of the first and second electrodes includes a plurality of electrode portions that are separate from each other.

16 Claims, 14 Drawing Sheets

U.S. PATENT DOCUMENTS

| | | | | |
|---|---|---|---|---|
| 6,262,532 | B1 * | 7/2001 | Park et al. | 313/585 |
| RE37,444 | E | 11/2001 | Kanazawa | |
| 6,630,916 | B1 | 10/2003 | Shinoda | |
| 6,707,436 | B2 | 3/2004 | Setoguchi et al. | |
| 6,777,873 | B2 * | 8/2004 | Hashikawa | 313/582 |
| 2004/0056595 | A1 * | 3/2004 | Shiokawa et al. | 313/582 |

FOREIGN PATENT DOCUMENTS

| | | |
|---|---|---|
| JP | 63-124338 | 5/1988 |
| JP | 08-095500 | 4/1996 |
| JP | 08-287834 | 11/1996 |
| JP | 2845183 | 10/1998 |
| JP | 2917279 | 4/1999 |
| JP | 11-126561 | 5/1999 |
| JP | 11-238462 | 8/1999 |
| JP | 2001-043804 | 2/2001 |
| JP | 2001-325888 | 11/2001 |
| JP | 2002-260538 | 9/2002 |
| JP | 2003-151449 | 5/2003 |
| JP | 2003-197106 | 7/2003 |
| JP | 2004-235042 | 8/2004 |

* cited by examiner

PLASMA DISPLAY PANEL (PDP) HAVING IMPROVED ELECTRODES STRUCTURE

CLAIM OF PRIORITY

This application makes reference to, incorporates the same herein, and claims all benefits accruing under 35 U.S.C. §119 from an application for PLASMA DISPLAY PANEL earlier filled in the Korean Intellectual Property Office on 4 Feb. 2005 and there duly assigned Serial No. 10-2005-0010333.

BACKGROUND OF THE INVENTION

1. Field of the Invention

The present invention relates to a Plasma Display Panel (PDP). More particularly, the present invention relates to a PDP structured to realize a high efficiency.

2. Description of the Related Art

Generally, a Plasma Display Panel (PDP) is a display device which excites phosphors with vacuum ultraviolet (VUV) rays radiated from plasma obtained through a gas discharge, and displays desired images by visible light generated by the excited phosphors. As the PDP allows a wide screen with a high resolution, it has been spotlighted as a future generation flat panel display.

A three-electrode surface-discharge PDP is an example of a general PDP. In the three-electrode surface discharge PDP, display electrodes are formed on a front substrate by pairs, and address electrodes are formed on a rear substrate spaced apart from the front substrate. A space between the front and rear substrates is partitioned by barrier ribs so as to form a plurality of discharge cells. A phosphor layer is formed in the discharge cells and a discharge gas is contained therein.

Whether a discharge cell is to be discharged or not is determined by an address discharge between the address electrode and one of the display electrodes. A sustain discharge in which an image is actually displayed is achieved by the display electrodes formed on the same plane. That is, in such a PDP, the address discharge is realized as an opposed discharge, and the sustain discharge is realized as a surface discharge.

Such PDPs display an image through several stages of discharge in which the efficiency is not perfect at each stage, so that the luminescence efficiency become substantially lowered. In particular, since the sustain discharge is realized as a surface discharge, a higher is voltage is required than in the case of an opposed discharge.

The efficiency of a PDP is defined as a ratio of luminescence with respect to power consumption. Therefore, in order to enhance the luminescence efficiency of a PDP, the power consumption must be reduced or the luminescence must be increased. Increasing the luminescence typically involves an increase in consumption of a current. However, when a current or a voltage supplied to a PDP increases, it generally reduces efficiency, and in addition thereto, it increases production cost of a display device supplied with a PDP since expensive parts must be employed.

Reducing power consumption (in particular, decreasing the supplied voltage) is generally regarded as an effective way of enhancing the luminescence efficiency and improving the manufacturing characteristics of a PDP.

The above information disclosed in this section is only for enhancement of understanding of the background of the invention and it may contain information that does not form the prior art that is already known in this country to a person of ordinary skill in the art.

SUMMARY OF THE INVENTION

The present invention has been made in an effort to provide a plasma display panel having an enhanced efficiency by firing a discharge in an opposed discharge mechanism with a short discharge gap so as to reduce the discharge firing voltage, and by increasing a discharge gap for a main discharge.

An exemplary Plasma Display Panel (PDP) according to the present invention includes: first and second substrates arranged facing each other and defining a space therebetween partitioned into at least one discharge cell; a phosphor layer arranged in the at least one discharge cell; an address electrode arranged along a first direction in the space between the first and second substrates; and first and second electrodes electrically insulated from the address electrode and arranged along a second direction crossing the first direction at opposite sides of each of the at least one discharge cells in the space between the first and second substrates. At least one of the first and second electrodes includes a plurality of electrode portions that are separate from each other.

The plurality of electrode portions are preferably arranged in a third direction perpendicular to the first substrate. The plurality of electrode portions preferably include: a discharge firing electrode portion arranged at a position corresponding to the address electrode in the third direction and at least one sustain electrode portion arranged either between the discharge firing electrode portion and the first substrate or between the discharge firing electrode portion and the second substrate. A distance between the first and second electrodes at a position of the discharge firing electrode portion is preferably less than a distance between the first and second electrodes at a position of the sustain electrode portion.

The discharge firing electrode portion preferably protrudes further toward an interior of each discharge cell than the sustain electrode portion.

The at least one sustain electrode portion preferably includes a plurality of sustain electrode portions arranged either between the discharge firing electrode portion and the first substrate or between the discharge firing electrode portion and the second substrate; and the plurality of electrode portions preferably protrude further and further toward the interior of a discharge cell corresponding thereto in a stepwise manner from either the sustain electrode portion adjacent to the first substrate or the second substrate to the discharge firing electrode portion.

The discharge firing electrode portion preferably includes a floating electrode.

The at least one sustain electrode portion is preferably elongated along the second direction. The at least one sustain electrode portion preferably either is arranged in a striped pattern or includes a protruding portion protruding toward an interior of the each discharge cell. The at least one sustain electrode portion preferably includes a first side facing the discharge firing electrode portion and a second side opposite to the first side; and the at least one sustain electrode portion in each discharge cell preferably gradually protrudes toward the interior of the each discharge cell from the second side to the first side. The at least one sustain electrode portion is preferably arranged between the discharge firing electrode portion and the first substrate; and the discharge firing electrode portion is preferably arranged facing the second substrate. The at least one sustain electrode portion is preferably arranged between the discharge firing electrode portion and the second substrate; and the discharge firing electrode portion is arranged facing the first substrate. The at least one sustain electrode portion is 1l preferably respectively arranged between the discharge firing electrode portion and the first substrate and between the discharge firing electrode portion and the second substrate.

The address electrode, the first electrode, and the second electrode are preferably covered by at least one dielectric layer.

The plasma display panel preferably further includes: a first barrier rib layer arranged adjacent to the first substrate and partitioning a first discharge cell at a side of the first substrate and a second barrier rib layer arranged adjacent to the second substrate and partitioning a second discharge cell at a side of the second substrate. The first and second discharge cells preferably cooperatively define one effective discharge cell and the address electrode and the first and second electrodes are preferably arranged between the first and second barrier rib layers. The address electrode is preferably commonly shared by adjacent discharge cells along the second direction. The address electrode preferably includes a protruding portion protruding toward an interior of one of the adjacent discharge cells.

Each of the discharge firing electrode portions of the first electrode and the discharge firing electrode portion of the second electrode preferably protrudes toward an interior of a discharge cell corresponding thereto and the protruding portion of the address electrode preferably protrudes toward a position between the discharge firing electrode portion of the first electrode and the discharge firing electrode portion of the second electrode.

A voltage is preferably supplied to at least one of the plurality of electrode portions.

At least one of the first and second electrodes preferably includes: a discharge firing electrode portion arranged at a position corresponding to the address electrode in a third direction and at least one sustain electrode portion arranged either between the discharge firing electrode portion and the first substrate or between the discharge firing electrode portion and the second substrate. The at least one sustain electrode portion and the discharge firing electrode portion preferably have the same potential or the at least one sustain electrode portion preferably has a higher potential than the discharge firing electrode portion.

At least one of the plurality of electrode portions preferably includes a floating electrode.

Such an exemplary PDP can be driven at a low voltage, thereby realizing a high efficiency. Accordingly, less expensive parts can be used for a PDP to achieve the same level of quality, and accordingly, production costs can be decreased.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
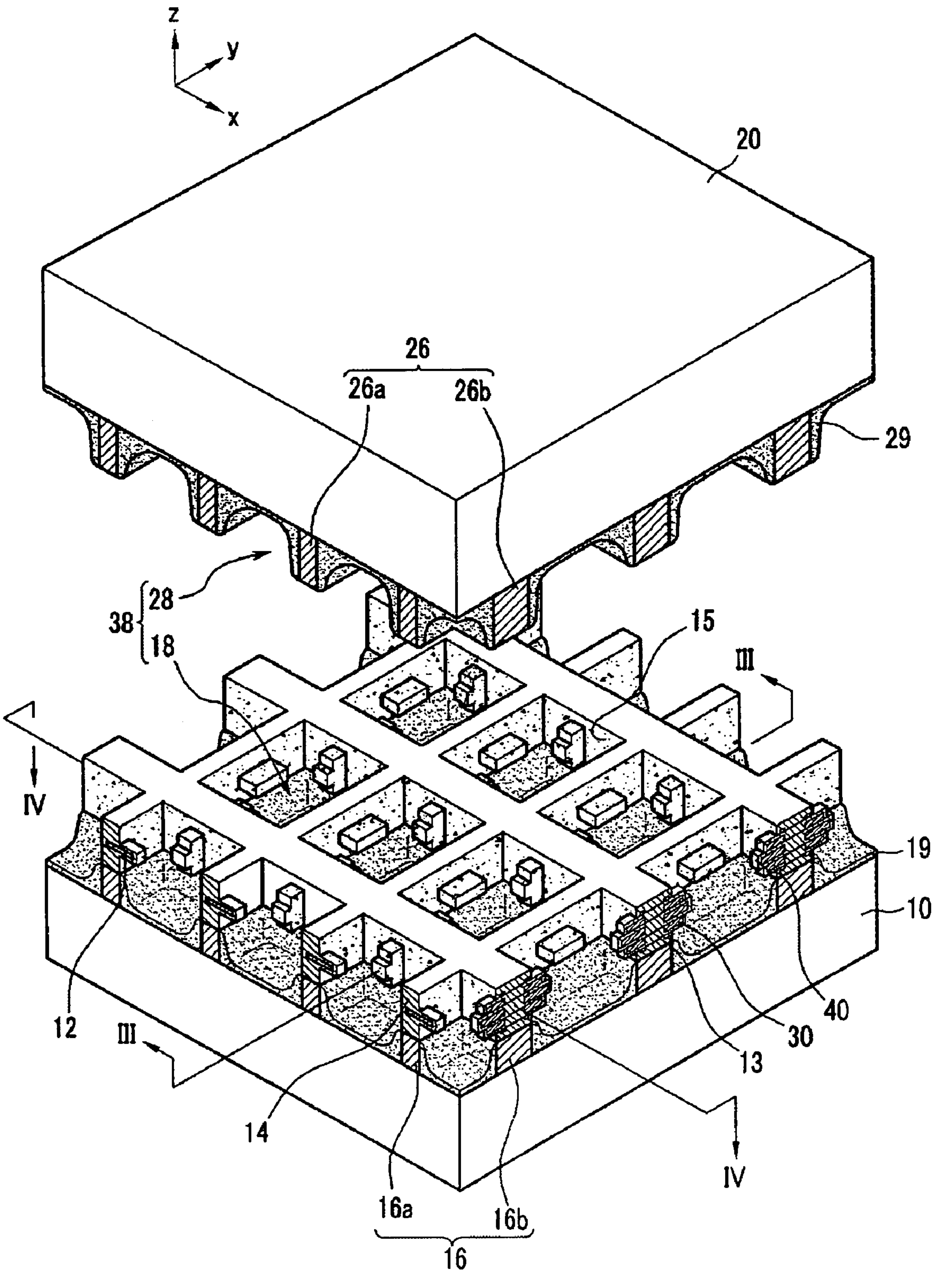
FIG. 1 is a partial exploded perspective view of a Plasma Display Panel (PDP) according to a first exemplary embodiment of the present invention.

FIG. 1 is a partial exploded perspective view of a Plasma Display Panel (PDP) according to a first exemplary embodiment of the present invention.

Referring to FIG. 1, a PDP according to the present exemplary embodiment includes a first substrate 10 (hereinafter called a "rear substrate") and a second substrate 20 (hereinafter called a "front substrate") that are disposed facing apart from each other. A space between the rear substrate 10 and the front substrate 20 is partitioned by barrier ribs 16 and 26 into a plurality of discharge cells 38. Phosphor layers 19 and 29 that absorb vacuum ultraviolet (VUV) rays and emit visible light are formed in the discharge cells 38, and a discharge gas (for example, a mixed gas of xenon (Xe), neon (Ne), etc.) is contained within the discharge cells 38.

The barrier ribs 16 and 26 includes a first barrier rib 16 (hereinafter called a "rear-plate barrier rib") formed on the rear substrate 10 and protruding toward the front substrate 20 and a second barrier rib 26 (hereinafter called a "front-plate barrier rib") formed on the front substrate 20 and protruding toward the rear substrate 10.

In the present exemplary embodiment, the rear-plate barrier rib 16 formed on the rear substrate 10 includes a first barrier rib member **16*a* formed along a first direction (y-axis direction in the drawing) and a second barrier rib member 16*b* formed along a second direction (x-axis direction in the drawing) crossing the first direction. Accordingly, rear plate discharge cells 18 having independent discharge spaces formed on the rear substrate 10**.

The front-plate barrier rib 26 formed on the front substrate 20 includes a third barrier rib member **26*a* protruding toward the rear substrate 10 in a shape corresponding to the first barrier rib member 16*a* and a fourth barrier rib member 26*b* protruding toward the rear substrate 10 in a shape corresponding to the second barrier rib member 16*b*. Accordingly, front plate discharge cells 28 corresponding to the rear plate discharge cells 18 are formed on the front substrate 20**.

In the present exemplary embodiment, the rear-plate barrier rib and front-plate barrier rib respectively include barrier rib members that intersect one another. However, the present invention is not limited thereto. On the contrary, various schemes of barrier ribs (for example, a striped pattern in which the barrier ribs are elongated in one direction) can also employed according to the present invention. In addition, dielectric layers 13 and 14 that will be described later can function to partition the discharge cells 38, and thus, the rear-plate barrier rib and the front-plate barrier rib are not always necessary.

One rear plate discharge cell 18 and one front plate discharge cell 28 corresponding thereto forms one effective discharge cell 38.

The first phosphor layer 19 and the second phosphor layer 29 are respectively formed in such a rear plate discharge cell 18 and front plate discharge cell 28. The first phosphor layer 19 is formed on lateral sides of the barrier rib members 16*a* and 16*b* of the rear-plate barrier rib 16 and on the rear substrate 10 surrounded by the rib members 16*a* and 16*b*. The second phosphor layer 29 is formed on lateral sides of the barrier rib members 26*a* and 26*b* of the front-plate barrier rib 26 and on the front substrate 20 surrounded by the rib members 26*a* and 26*b*.

The first phosphor layer 19 and the second phosphor layer 29 in the rear plate discharge cell 18 and the front plate discharge cell 28 respectively absorb vacuum ultraviolet (VUV) rays and emits visible light toward the front substrate 20. Because visible light is transmitted through the second phosphor layer 29, the second phosphor layer 29 can preferably be formed thinner than the first phosphor layer 19 so as to reduce the loss of visible light. Therefore, in this case, the VUV rays are maximally utilized and the luminescence efficiency can be enhanced.

Since the rear plate and front plate discharge cells 18 and 28 form one effective discharge cell 38 as described above, the first and second phosphor layers 19 and 29 formed in each discharge cell 38 can be configured to emit visible light of the same color by incidence of VUV rays generated by a gas discharge.

According to the present exemplary embodiment, the brightness can be enhanced since the phosphor layers 19 and 29 that emit visible light are formed on both sides of the one effective discharge cell 38.

The first phosphor layer 19 formed in the rear plate discharge cell 18 can be formed by applying a phosphor on a dielectric layer (not shown) after forming the dielectric layer on the rear substrate 10 and the rear-plate barrier rib 16 thereon. Alternatively, the first phosphor layer 19 can be formed by applying a phosphor on the rear substrate 10 without forming a dielectric layer on the rear substrate but after forming the rear-plate barrier rib 16 thereon.

In the same way, the second phosphor layer 29 formed in the front plate discharge cell 28 can be formed by applying a phosphor on a dielectric layer (not shown) after forming the dielectric layer on the front substrate 20 and the front-plate barrier rib 26 thereon. Alternatively, the second phosphor layer 29 can be formed by applying a phosphor on the surface of the front substrate 20 without forming a dielectric layer on the front substrate 20 but after forming the front-plate barrier rib 26 thereon.

The vacuum ultraviolet (VUV) rays are incident on the first phosphor layer 19 and the second phosphor layer 29 and are converted to visible light by a plasma discharge. For such a plasma discharge, an address electrode 12, a first electrode 30 (hereinafter called a "sustain electrode"), and a second electrode 40 (hereinafter called a "scan electrode") are provided between the rear and front substrates 10 and 20, corresponding to the discharge cell 38.

A turn-on discharge cell (i.e., a discharge cell that is to be turned on) is selected from among the discharge cells 38 during an address period by an address discharge between the scan electrode 40 and the address electrode 12. A desired brightness is expressed during a sustain period by the sustain electrode 30 and the scan electrode 40. However, the present invention is not limited thereto, since the electrodes can play different roles by their signal voltages.

In the present exemplary embodiment, the address electrode 12 is elongated along the first direction between the first barrier rib member 16*a* and the third barrier rib member 26*a*.

In addition, the sustain electrode 30 and the scan electrode 40 are electrically insulated 11 from the address electrode 12 and are formed along the second direction between the second barrier rib member 16*b* and the fourth barrier rib member 26*b*. The sustain electrode 30 and the scan electrode 40 are positioned at opposite sides of the discharge cell 38 and face each other. Accordingly, the sustain discharge can be realized as an opposed discharge, and thus, a discharge firing voltage for the sustain discharge can be lowered.

In the present exemplary embodiment, the sustain electrode 30 and the scan electrode 40 can be formed as metal electrodes having a high electrical conductivity, since they are provided at lateral sides of the discharge cell 38 and minimally interfere with the expressed image.

The sustain electrodes 30 and the scan electrodes 40 can be arranged such that a sequence of the sustain electrode 30, the scan electrode 40, the sustain electrode 30, and the scan electrode 40 can be repeated with respect to the discharge cells 38 consecutively arranged in the first direction. Alternatively, they can be arranged such that a sequence of the sustain electrode 30, the scan electrode 40, the scan electrode 40, and the sustain electrode 30 can be repeated.

Although the sustain electrode 30 and the scan electrode 40 are shown in the drawing to be separately provided to each discharge cell 38, the present invention is not limited thereto. At least one of the two electrodes can be formed to be commonly shared by a pair of adjacent discharge cells in the first direction.

In the present exemplary embodiment, such sustain and scan electrodes 30 and 40 are formed of a plurality of electrode portions arranged in the third direction (z-axis direction in the drawing) perpendicular to the rear substrate 10. Such electrode portions are described later in more detail with reference to FIG. 2 to FIG. 4.

The dielectric layers 13 and 14 are respectively formed between electrode portions of the sustain electrode 30 and the scan electrode 40 and exterior of the address electrode 12, the sustain electrode 30, and the scan electrode 40.

In more detail, the dielectric layer 14 encloses the address electrode and is formed along the first direction. The dielectric layer 13 encloses the sustain electrode 30 or the scan electrode 40 and is formed along the second direction. The dielectric layers 13 and 14 enable insulation between the electrodes 12, 30, and 40 and accumulation of wall charges formed by the plasma discharge.

A protective layer 15 can be formed on surfaces of the dielectric layers 13 and 14 at portions exposed to the plasma discharge generated in the discharge cell 38 (that is, at lateral sides of the dielectric layers 13 and 14). The protective layer 15 protects the dielectric layers 13 and 14 from collisions of ions that are ionized by the plasma discharge, and emits secondary electrons.

In the present exemplary embodiment, the protective layer 15 is formed at a lateral side of the discharge cell 38, and thus can be formed of a material opaque with respect to visible light. In this case, the protective layer 15 can be formed of non-transparent MgO. Such a non-transparent MgO has a secondary electron emission coefficient much higher than a transparent MgO, and therefore the discharge firing voltage can be further lowered.

Electrode portions of the sustain electrode 30 and the scan electrode 40 and the address electrode 12 are described in detail with reference to FIG. 2 to FIG. 4.

Figure 2:
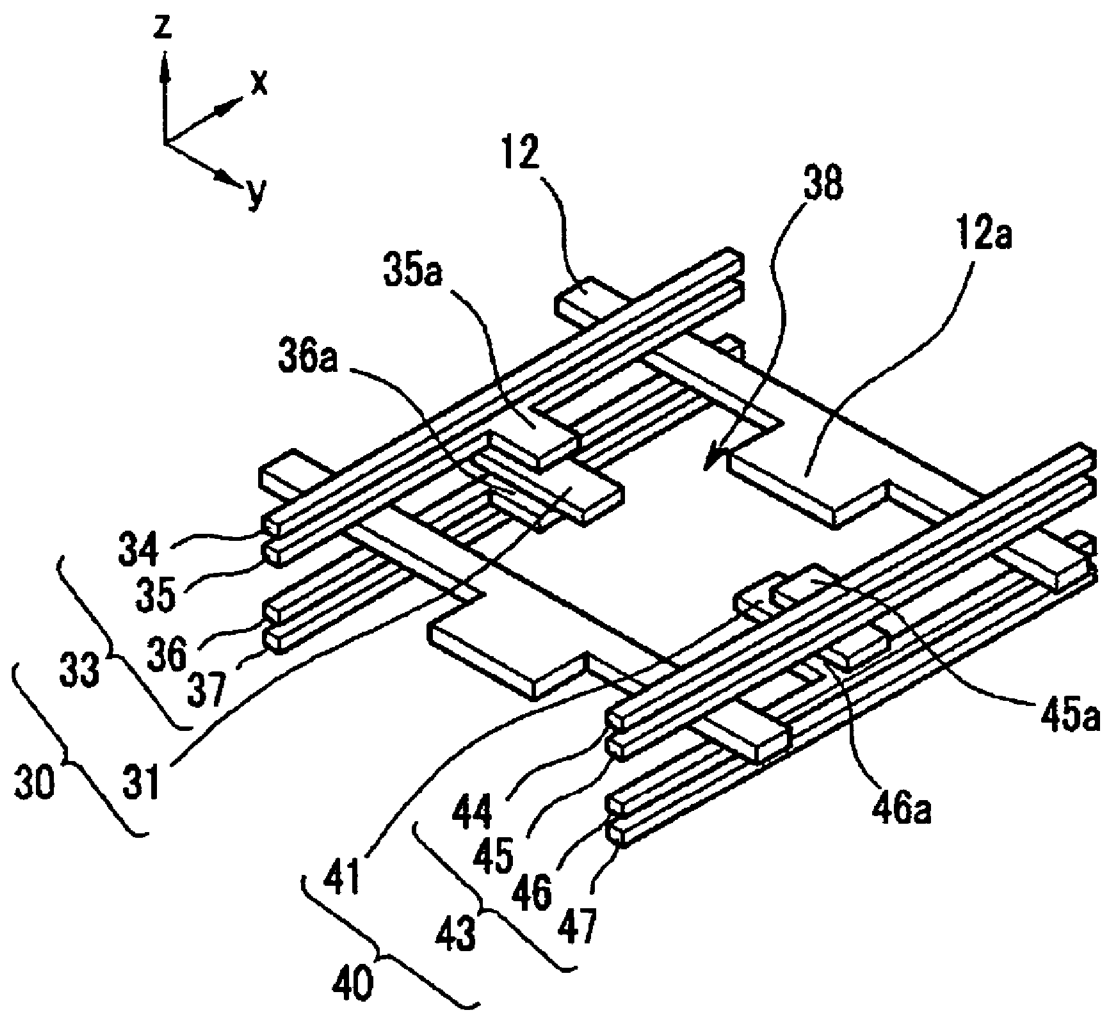
FIG. 2 is a partial perspective view of an electrode arrangement corresponding to each discharge cell in a PDP according to a first exemplary embodiment of the present invention.

FIG. 2 is a partial perspective view of an electrode arrangement corresponding to each discharge cell in a PDP according to a first exemplary embodiment of the present invention. FIG. 3 is a partial sectional view of an assembled PDP taken along the line III-III of FIG. 1. FIG. 4 is a partial sectional view of an assembled PDP taken along the line IV-IV of FIG. 1.

Figure 3:
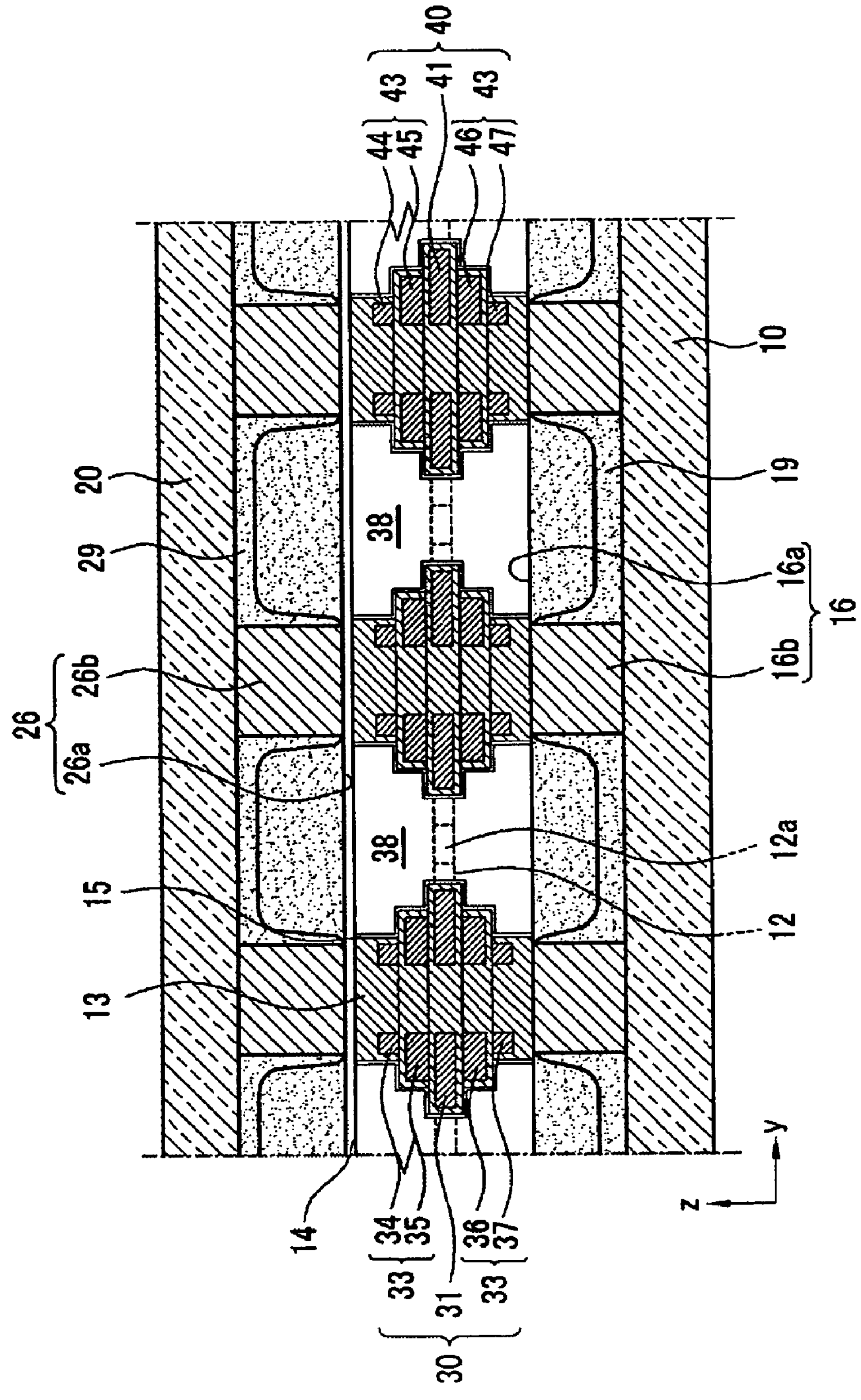
FIG. 3 is a partial sectional view of an assembled PDP taken along the line III-III of FIG. 1.

As described above, between the rear-plate barrier rib 16 and the front-plate barrier rib 26, the sustain electrode 30 and the scan electrode 40 include a plurality of electrode portions 31, 33, 41, and 43 that are separated by the dielectric layer 13 and arranged in the third direction, as shown in FIG. 2 and FIG. 3.

Among the plurality of electrode portions 31, 33, 41, and 43, the discharge firing electrode portions 31 and 41 are located at positions in the third direction corresponding to the address electrode 12. At least one sustain electrode portion 33 is located between the discharge firing electrode portion 31 and the rear-plate barrier rib 16 and between the discharge firing electrode portion 31 and the front-plate barrier rib 26. At least one sustain electrode portion 43 is located between the discharge firing electrode portion 41 and the rear-plate barrier rib 16 and between the discharge firing electrode portion 41 and the front-plate barrier rib 26.

The discharge firing electrode portions 31 and 41 denote electrode portions that fire the discharge with a short discharge gap. The sustain electrode portions 33 and 43 denote electrode portions except for the discharge firing electrode portions 31 and 41. The discharge firing electrode portions 31 and 41 also function to maintain the fired discharge, as well as to fire the discharge, The number of the discharge firing electrode portions and the sustain electrode portion are not limited in the present invention. It suffices if at least one discharge firing electrode portion and at least one sustain electrode portion are provided.

In the present exemplary embodiment, the discharge firing electrode portions 31 and 41 are formed in a shape of a rectangular parallelepiped that protrudes toward the respective discharge cells 38. In addition, the discharge firing electrode portions 31 and 41 are separately formed at each discharge cell 38 such that they do not interfere with the address electrodes 12 formed at corresponding positions in the third direction.

In addition, the sustain electrode portions 33 and 43 are elongated in the second direction. The sustain electrode portions 33 of the sustain electrode 30 include a first sustain electrode portion 34, a second sustain electrode portion 35, a third sustain electrode portion 36, and a fourth sustain electrode portion 37. In the same way, the sustain electrode portions 43 of the scan electrode 40 include a first sustain electrode portion 44, a second sustain electrode portion 45, a third sustain electrode portion 46, and a fourth sustain electrode portion 47.

One of the respective first sustain electrode portions 34 and the second sustain electrode portions 35 is disposed between the discharge firing electrode portions 31 and the front substrate 20 (in more detail, front-plate barrier rib 26). One of the respective first sustain electrode portions 44 and the second sustain electrode portions 45 is disposed between the discharge firing electrode portions 41 and the front substrate 20 (in more detail, front-plate barrier rib 26). In this case, the first sustain electrode portions 34 and 44 are close to the front-plate barrier rib 26, and the second sustain electrode portions 35 and 45 are close to the discharge firing electrode portions 31 and 41.

In addition, the third sustain electrode portions 36 and the fourth sustain electrode portions 37 are respectively disposed between the discharge firing electrode portion 31 and the rear substrate 10 (in more detail, rear-plate barrier rib 16). The respective third sustain electrode portions 46 and the fourth sustain electrode portions 47 are respectively disposed between the discharge firing electrode portion 41 and the rear substrate 10 (in more detail, rear-plate barrier rib 16). In this case, the third sustain electrode portions 36 and 46 are close to the discharge firing electrode portions 31 and 41, and the fourth sustain electrode portions 37 and 47 are close to the rear-plate barrier rib 16.

In the present exemplary embodiment, the first sustain electrode portions 34 and 44 and the fourth sustain electrode portions 37 and 47 that are close to the front-plate barrier rib 26 and the rear-plate barrier rib 16 are formed in a stripe pattern. The second sustain electrode portions 35 and 45 and the third sustain electrode portions 36 and 46 that are close to the discharge firing electrode portions 31 and 41 are provided with protruding portions **35*a*, 36*a*, 45*a*, and 46*a* in a shape of a rectangular parallelepiped protruding toward an interior of the discharge cell 38. In the present exemplary embodiment, the discharge firing electrode portions 31 and 41 protrude toward the interior of the discharge cell 38 by a greater distance than the protruding portions 35*a*, 36*a*, 45*a*, and 46*a* of the second sustain electrode portions 35 and 45 and the third sustain electrode portions 36 and 46**.

That is, in the present exemplary embodiment, the electrode portions 31 and 33 protrude further and further toward the interior of the discharge cell 38 in a stepwise manner from the first and fourth sustain electrode portions 34 and 37 closest to the front-plate barrier rib 26 and rear-plate barrier rib 16, to the discharge firing electrode portion 31. The electrode portions 41 and 43 protrude further and further toward the interior of the discharge cell 38 in a stepwise manner from the first and fourth sustain electrode portions 44 and 47 closest to the front-plate barrier rib 26 and rear-plate barrier rib 16, to the discharge firing electrode portion 41.

Therefore, as shown in FIG. 3, a distance between the sustain electrode 30 and the scan electrode 40 is formed shorter between the discharge firing electrode portion 31 of the sustain electrode 30 and the discharge firing electrode portion 41 of the scan electrode 40 than between the sustain electrode portions 33 of the sustain electrode 30 and the sustain electrode portions 43 of the scan electrode 40. Therefore, the sustain discharge generated between the scan and sustain electrodes 30 and 40 is fired at the short gap between the discharge firing electrode portions 31 and 41, and then main discharge is generated at the long gap between the sustain electrode portions 33 and 43. That is, the discharge firing voltage is lowered because the discharge is fired at the short gap, and at the same time the discharge efficiency is enhanced because the main discharge is maintained at the long gap.

In addition, the discharge gap increases in a stepwise manner from between the discharge firing electrode portions 31 and 41 to the rear-plate barrier rib 16 or the front-plate barrier rib 26, and hence stability of the discharge is obtained.

Figure 4:
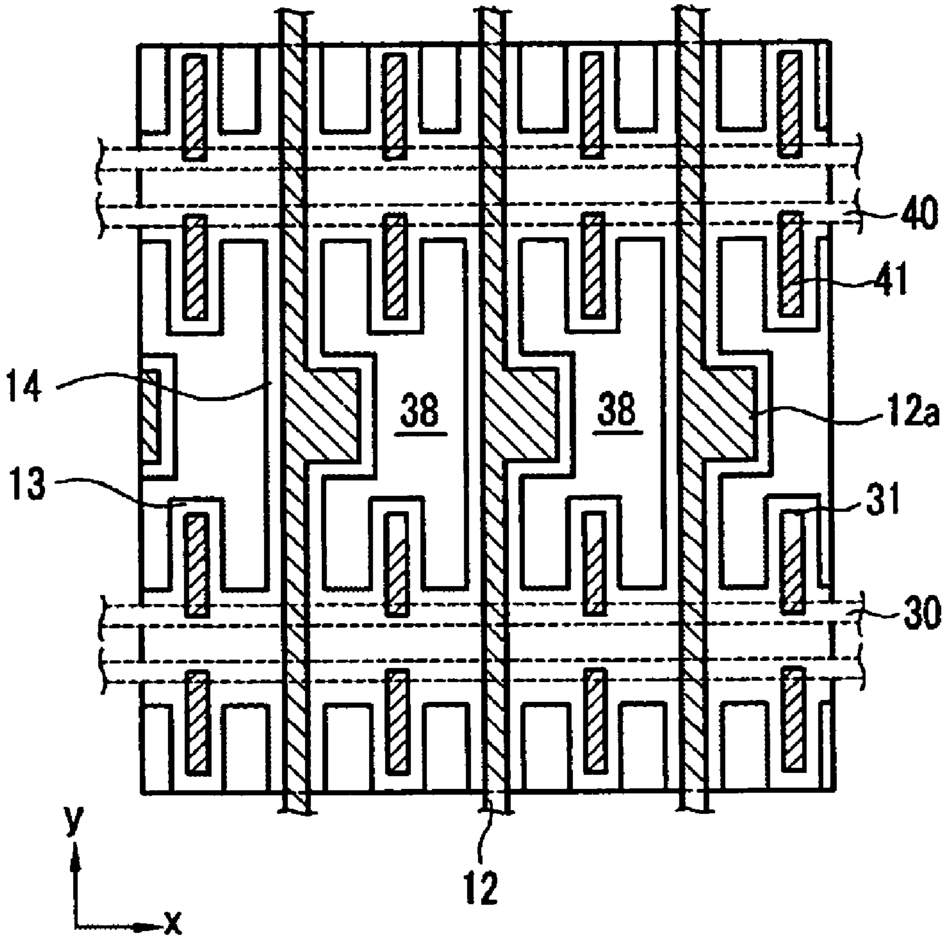
FIG. 4 is a partial sectional view of an assembled PDP taken along the line IV-IV of FIG. 1.

In addition, referring to FIG. 4, the address electrodes 12 are commonly shared by adjacent discharge cells 38 in the second direction. The address electrode 12 is provided with a protruding portion **12*a* protruding toward the interior of one discharge cell among the adjacent discharge cells 38 so as to be capable of selecting the one discharge cell. The protruding portion 12***a* of such an address electrode 12 protrudes toward between the discharge firing electrode portion 31 of the sustain electrode 30 and the discharge firing electrode portion 41 of the scan electrode 40.

The protruding portion 12*a* of the address electrode 12 that is involved in the address discharge of the discharge cell 38 among the pair of adjacent discharge cells can decrease the discharge firing voltage of the address discharge by reducing the distance to the scan electrode 40. In addition, the reactive power of the PDP can also be decreased by reducing portions that have little contribution to the address discharge.

In the present exemplary embodiment, the discharge firing voltage for firing the address discharge can become uniform regardless of discharge cells for green (G), red (R), and blue (B) colors, since a phosphor layer is not formed between the address electrode 12 and the scan electrode 40.

In the present exemplary embodiment, the electrodes 12, 30, and 40 of such a structure can be fabricated by separately fabricating the address electrode 12, the sustain electrode 30, the scan electrode 40 and the dielectric layers 13 and 14 and then combining them with the rear substrate 10 formed with the rear-plate barrier rib 16.

In more detail, dielectric layers 13 and 14 enclosing the electrodes 12, 30, and 40 therein can be fabricated by alternately and sequentially forming the electrode layers and the dielectric layers so as to form a plurality of electrode portions separated by the dielectric layers, and then by etching the dielectric layer to form the discharge space. The address electrode 12 is also formed in the process of forming the discharge firing electrode portions 31 and 41.

In the present exemplary embodiment, a plurality of electrode portions 31, 33, 41, and 43 separated by the dielectric layer 13 form the sustain electrode 30 and the scan electrode 40. Therefore, the electrodes 30 and 40 can be fabricated in an opposed discharge structure, realizing both the short gap discharge and the long gap discharge, by the above-described simple process.

In order to realize a desired image on the PDP according to the present exemplary embodiment, a voltage is supplied to all or only some of the sustain electrode portions 33 and 43 among the sustain electrode 30 and the scan electrode 40. Even if only some of the electrode portions are supplied with the voltage, a potential required for a discharge can be formed at each electrode portion by capacitive coupling. That is, the potential required for the discharge is formed at the discharge firing electrode portions 31 and 41 that are separate in each discharge cell 38 such that they form floating electrodes. In consideration of a stability of the discharge, it is preferable for the potential supplied to the sustain electrode portion 33 and 43 to be greater than or equal to the potential supplied to the discharge firing electrode portions 31 and 41.

In the above description, the sustain electrode 30 and the scan electrode 40 have been described as respectively formed as a plurality of electrode portions. However, the present invention is not limited thereto. At least one electrode among the sustain electrode 30 and the scan electrode 40 can be made of a single electrode portion.

Hereinafter, PDPs according to second to eleventh exemplary embodiments of the present invention are described in detail with reference to the drawings. PDPs according to the second to eleventh exemplary embodiments of the present invention are similar to the PDP according to the first exemplary embodiment. In the drawings for the various embodiments, like reference numerals designate like elements, and only differences between the embodiments are focused on in the following description.

Figure 5:
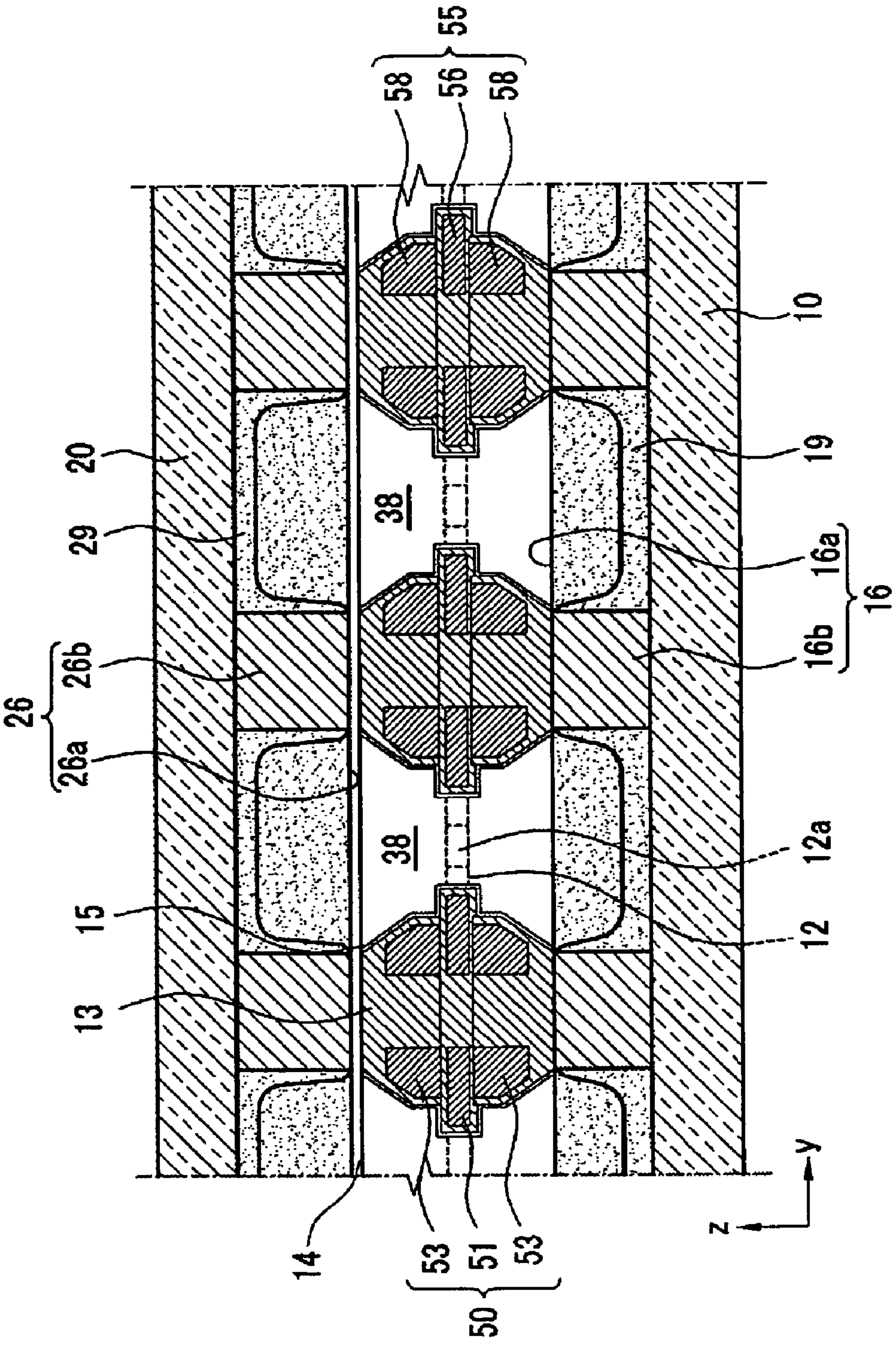
FIG. 5 is a partial cross-sectional view of a PDP according to a second exemplary embodiment of the present invention.

FIG. 5 is a partial cross-sectional view of a PDP according to a second exemplary embodiment of the present invention.

In the present exemplary embodiment, the sustain electrode 50 includes a discharge firing electrode portion 51 and sustain electrode portions 53. The discharge firing electrode portion 51 is positioned corresponding to the address electrode 12. The sustain electrode portions 53 are positioned between the discharge firing electrode portion 51 and the front-plate barrier rib 26, and also between the discharge firing electrode portion 51 and the rear-plate barrier rib 16. The scan electrode 55 includes a discharge firing electrode portion 56 and sustain electrode portions 58. The discharge firing electrode portion 56 is positioned corresponding to the address electrode 12. The sustain electrode portions 58 are positioned between the discharge firing electrode portion 53 and the front-plate barrier rib 26 and also between the discharge firing electrode portion 53 and the rear-plate barrier rib 16.

In the present exemplary embodiment, lengths of the sustain electrode portions 53 and 58 measured along the first direction (y-axis direction in the drawing) are shortened in a gradual manner from a first side facing the discharge firing electrode portions 51 and 56 to a second side that is opposite to the first side. That is, the sustain electrode portions 53 and 58 bulge out toward the interior of the discharge cell 38 in a gradual manner from the second side to the first side.

Accordingly, the discharge gap between the sustain electrode 50 and the scan electrode 55 increases in a gradual manner from the discharge firing electrode portions 51 and 56 to the sustain electrode portion 53 and 58. Accordingly, the discharge gap between the sustain electrode 50 and the scan electrode 55 gradually increases from a short gap to a long gap, and therefore the discharge can be easily spread, thereby enhancing the stability of the discharge.

Figure 6:
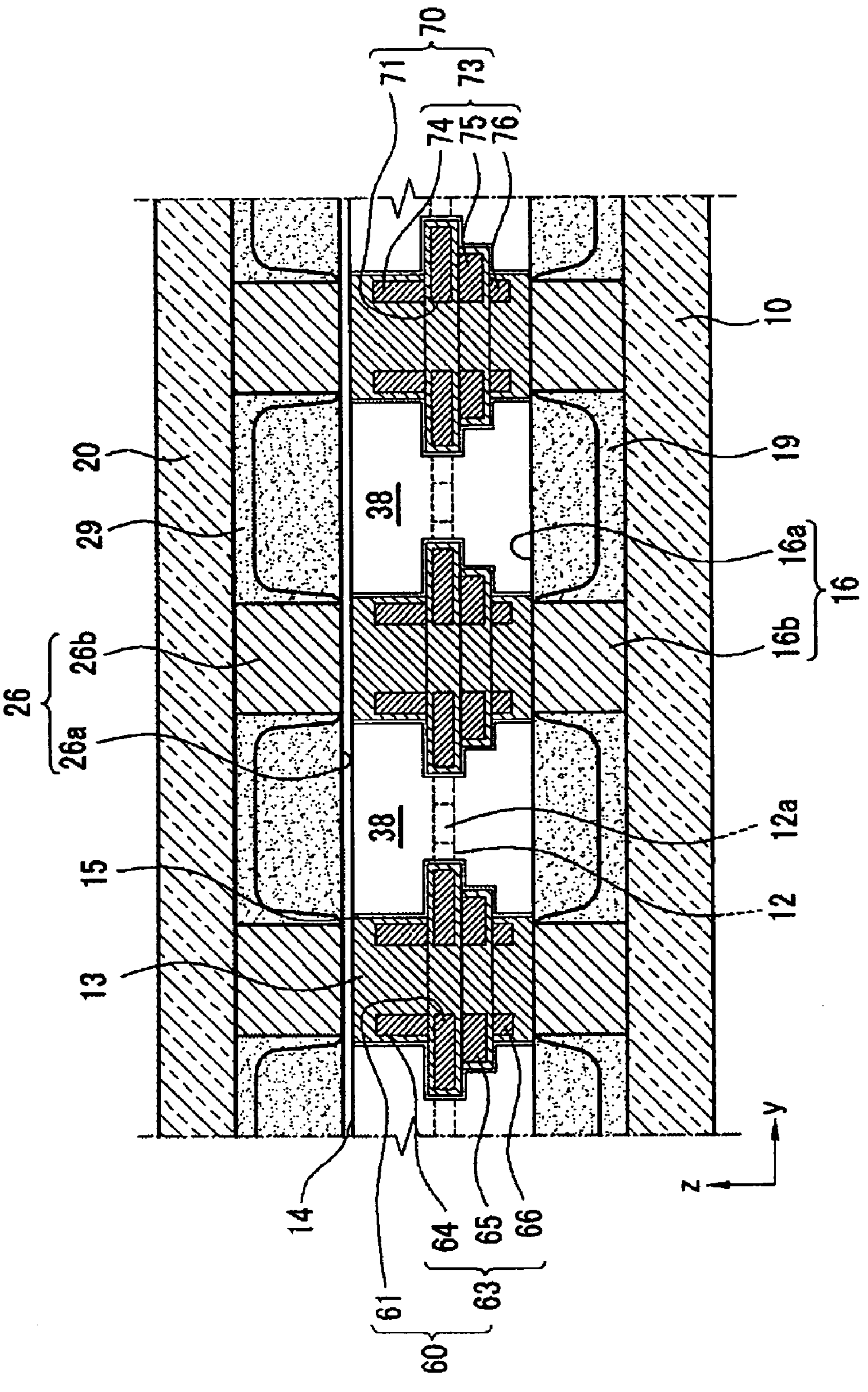
FIG. 6 is a partial cross-sectional view of a PDP according to a third exemplary embodiment of the present invention.

FIG. 6 is a partial cross-sectional view of a PDP according to a third exemplary embodiment of the present invention.

Referring to FIG. 6, the sustain electrode 60 and the scan electrode 70 according to the present exemplary embodiment include discharge firing electrode portions 61 and 71 and sustain electrode portions 63 and 73. In the present exemplary embodiment, the numbers of sustain electrode portions 64 and 74 respectively disposed between discharge firing electrode portions 61 and 71 and the front-plate barrier rib 26 are different from the numbers of the sustain electrode portions 65,66,75, and 76 respectively disposed between the discharge firing electrode portion 61 and 71 and rear-plate barrier rib 16.

As an example, according to the present exemplary embodiment, single sustain electrode portions 64 and 74 are respectively disposed between the discharge firing electrode portion 61 and 71 and the front-plate barrier rib 26. In addition, pairs of the sustain electrode portions 65 and 66 and the sustain electrode portions 75 and 76 are respectively disposed between the discharge firing electrode portions 61 and 71 and the rear-plate barrier rib 16. However, it should be understood that the present invention is not limited to these specific numbers.

Figure 7:
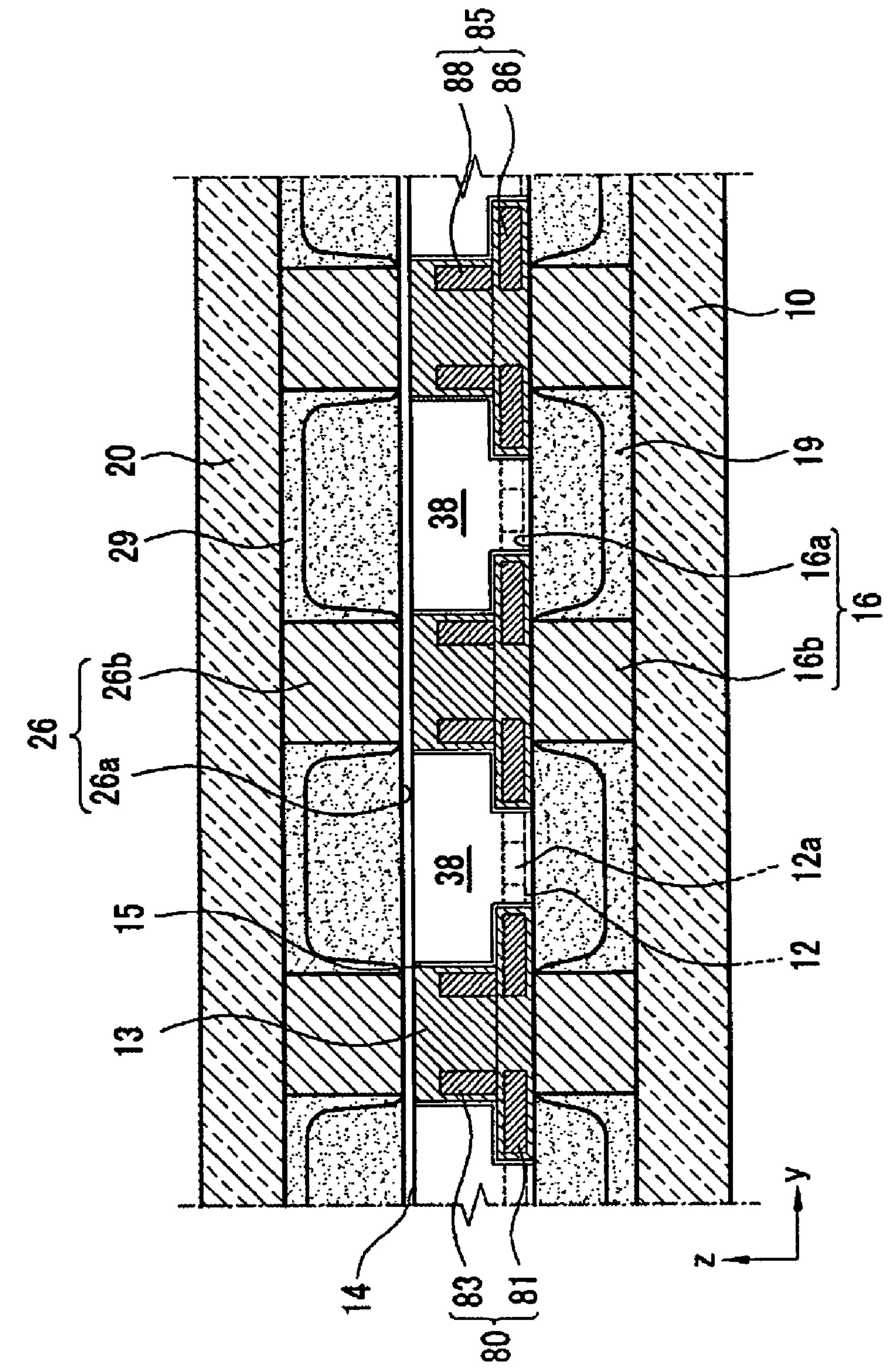
FIG. 7 is a partial cross-sectional view of a PDP according to a fourth exemplary embodiment of the present invention.

FIG. 7 is a partial cross-sectional view of a PDP according to a fourth exemplary embodiment of the present invention.

Referring to FIG. 7, in a sustain electrode 80 and a scan electrode 85 according to the present exemplary embodiment, discharge firing electrode portions 81 and 86 and the address electrode 12 are formed facing the rear substrate 10, and sustain electrode portions 83 and 88 are positioned between the discharge firing electrode portions 81 and 86 and the front-plate barrier rib 26. In the present exemplary embodiment, a single sustain electrode portion is disposed between the discharge firing electrode portion and the front-plate barrier rib. However, it should be understood that the present invention is not limited thereto.

Figure 8:
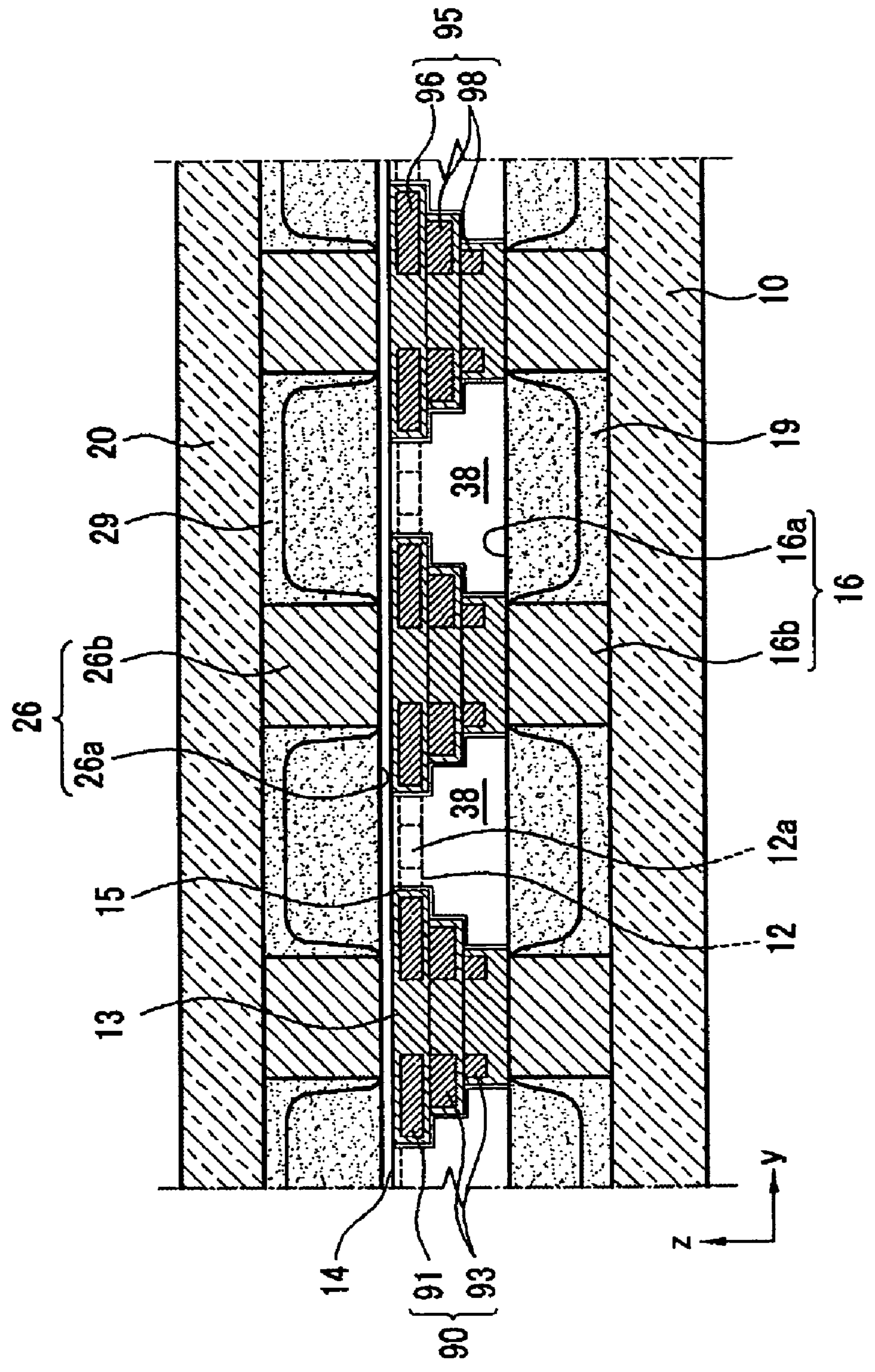
FIG. 8 is a partial cross-sectional view of a PDP according to a fifth exemplary embodiment of the present invention.

FIG. 8 is a partial cross-sectional view of a PDP according to a fifth exemplary embodiment of the present invention.

Referring to FIG. 8, in a sustain electrode 90 and a scan electrode 95 according to the present exemplary embodiment, discharge firing electrode portions 91 and 96 and the address electrode 12 are formed facing the front substrate 20, and sustain electrode portions 93 and 98 are positioned between the discharge firing electrode portions 91 and 96 and the rear-plate barrier rib 16. It should be understood that the number of sustain electrode portions is not limited in the present invention, and to the contrary, it can have various values.

Figure 9:
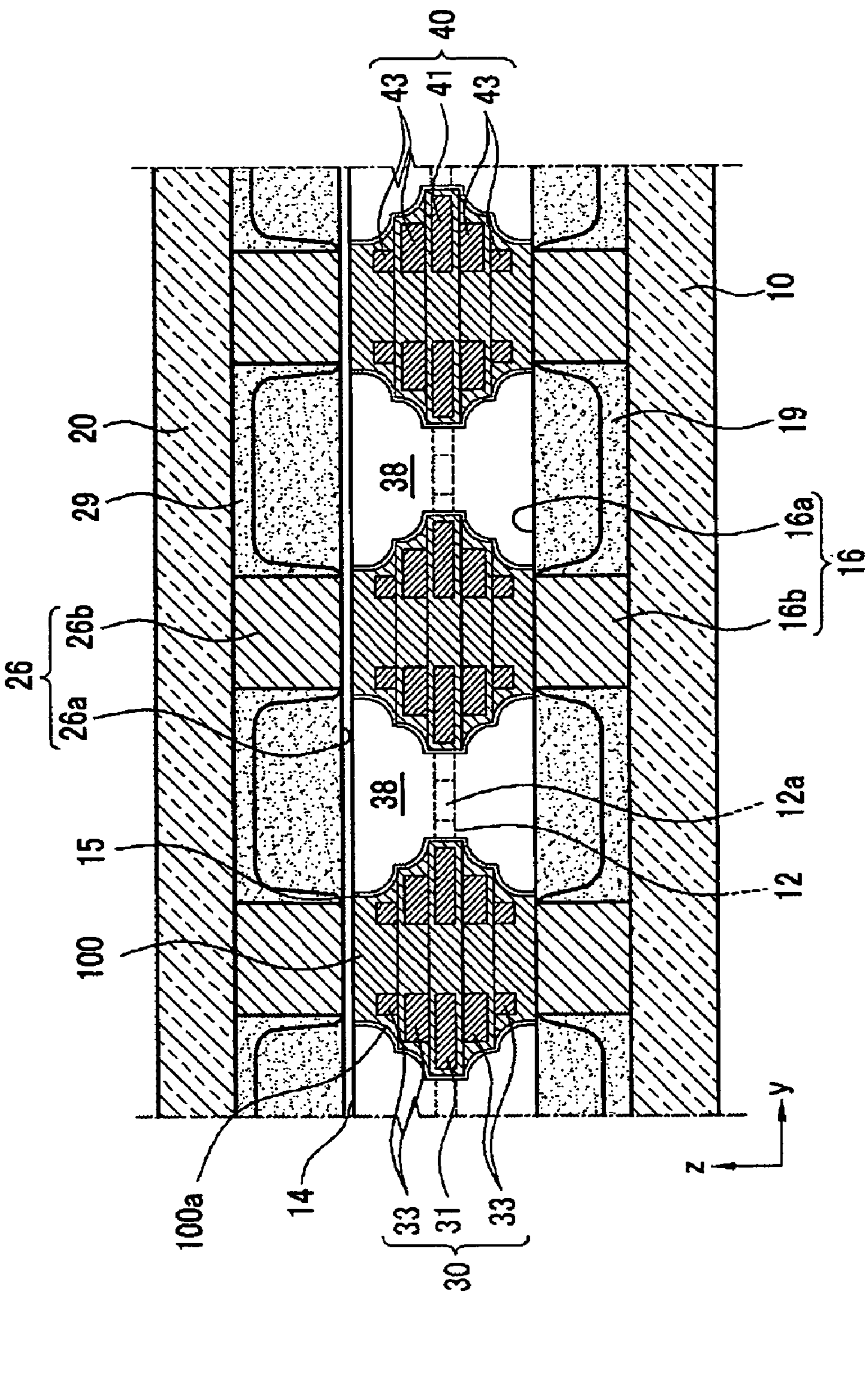
FIG. 9 is a partial cross-sectional view of a PDP according to a sixth exemplary embodiment of the present invention.

FIG. 9 is a partial cross-sectional view of a PDP according to a sixth exemplary embodiment of the present invention.

Referring to FIG. 9, according to the present exemplary embodiment, a dielectric layer 100 forms curved surfaces at a surface 100*a* covering the electrode portions 31 and 33 forming the sustain electrode 30 and at a surface 100*a* covering the electrode portions 41 and 43 forming the scan electrode 40. In the present exemplary embodiment, the dielectric layer 100 has curved surfaces at the opposing surfaces 100*a*. However, it should be understood that the present invention is not limited thereto, and to the contrary, the dielectric layer can be formed in a variety of shapes to form a discharge space.

Figure 10:
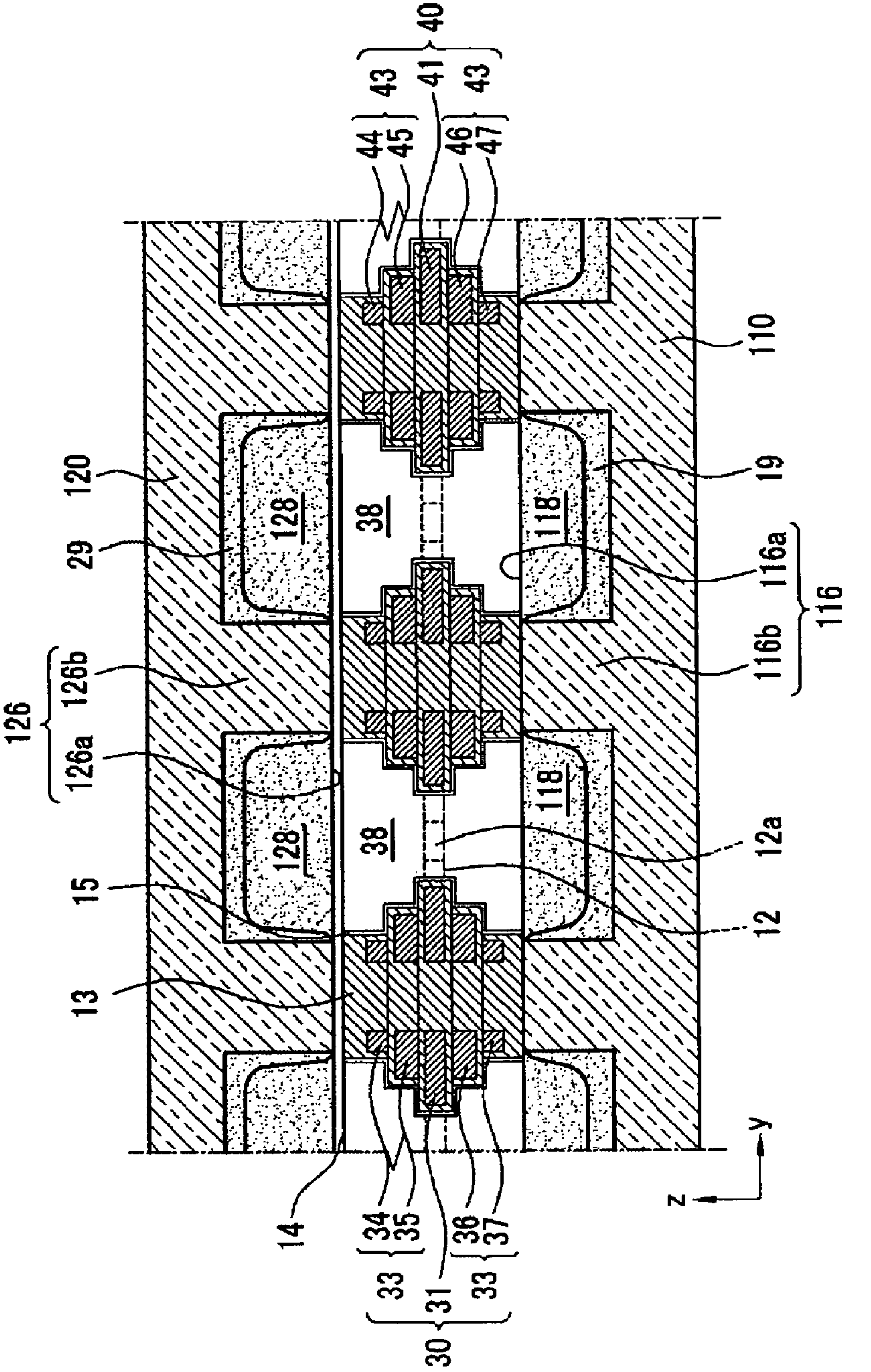
FIG. 10 is a partial cross-sectional view of a PDP according to a seventh exemplary embodiment of the present invention.

FIG. 10 is a partial cross-sectional view of a PDP according to a seventh exemplary embodiment of the present invention.

Referring to FIG. 10, according to the present exemplary embodiment, a rear-plate barrier rib 116 including first and second barrier rib members 116*a* and 116*b* is integrally formed with a rear substrate 110 and is formed of the same material. In addition, a front-plate barrier rib 126 including the third and fourth barrier rib members 126*a* and 126*b* is integrally formed with a front substrate 120 and is formed of the same material. Such a structure can be realized by etching e.g., a glass substrate, to form shapes corresponding to rear plate discharge cells 118 and front plate discharge cells 128. By integrally forming the rear-plate barrier rib 116 with the rear substrate 110 and the barrier rib 126 with the front substrate 120, the manufacturing process of a PDP can be simplified and the manufacturing cost thereof can be reduced.

FIG. 11 to FIG. 14 are partial cross-sectional views of PDPs according to eighth to eleventh exemplary embodiments of the present invention. According to the eighth to eleventh exemplary embodiments, electrodes and protruding portions thereof are formed in various shapes and sizes.

Figure 11:
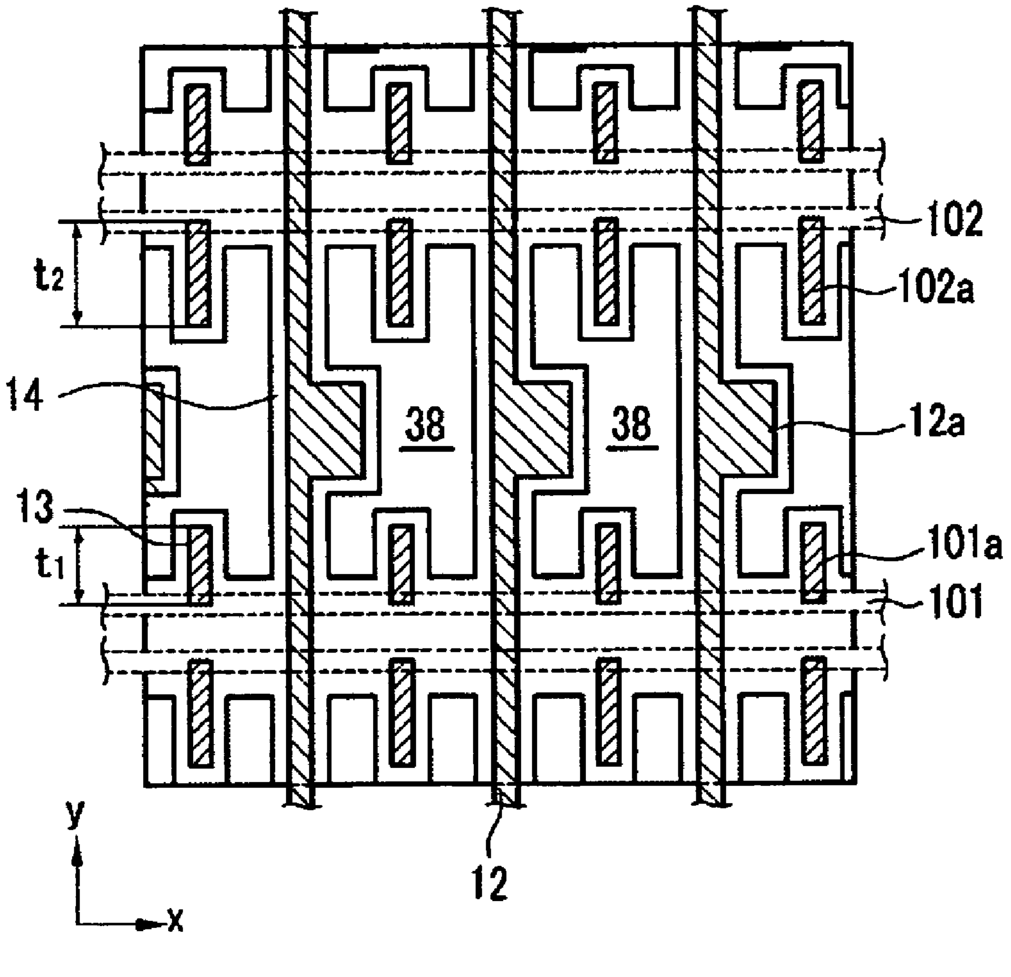
FIG. 11 is a partial cross-sectional view of a PDP according to an eighth exemplary embodiment of the present invention.

Referring to FIG. 11, according to the eighth exemplary embodiment of the present invention, a discharge firing electrode portion 102*a* of a scan electrode 102 protrudes toward the interior of the discharge cell 38 further than a discharge firing electrode portion 101*a* of a sustain electrode 101. That is, length (t2) of the discharge firing electrode portion 102*a* of the scan electrode 102 measured in the first direction (y-axis direction in the drawing) is longer than length (t1) of the discharge firing electrode portion 101*a* of the sustain electrode 101 measured in the first direction. Accordingly, the address electrode 12 and the discharge firing electrode portion 102*a* of the scan electrode 102 can face each other with a wider area, and therefore the discharge firing voltage for the address discharge can be further decreased.

Figure 12:
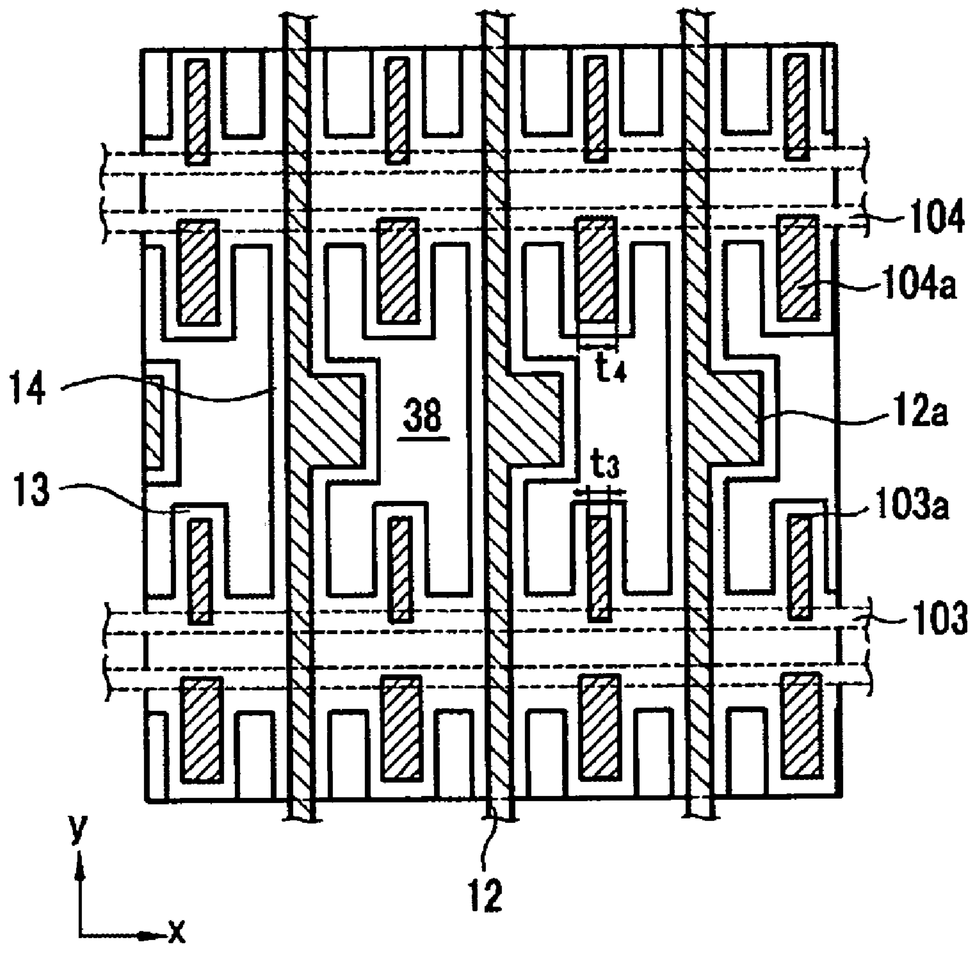
FIG. 12 is a partial cross-sectional view of a PDP according to a ninth exemplary embodiment of the present invention.

Referring to FIG. 12, according to the ninth exemplary embodiment of the present invention, a width (t4) of a discharge firing electrode portion 104*a* of a scan electrode 104 measured in the second direction (x-axis direction in the drawing) is greater than a width (t3) of a discharge firing electrode portion 103*a* of a sustain electrode 103 measured in the second direction. Accordingly, the address discharge can be generated more easily between the address electrode 12 and the scan electrode 104.

Figure 13:
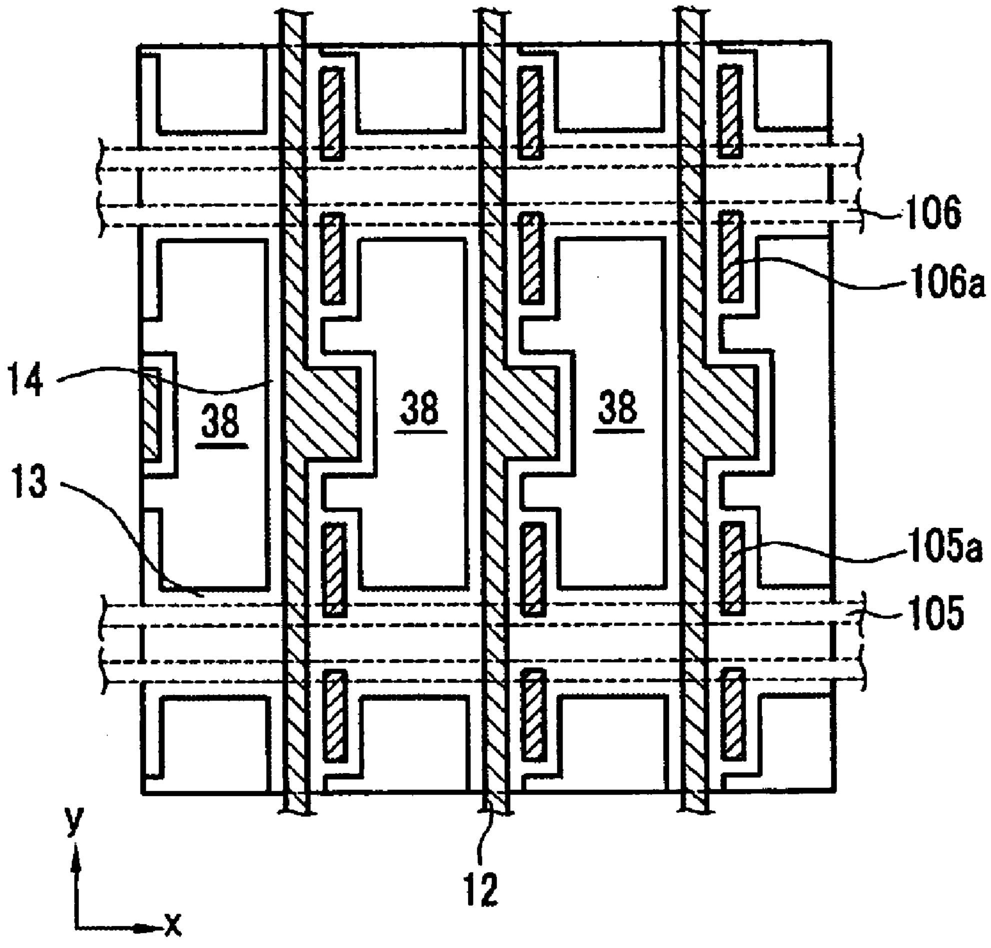
FIG. 13 is a partial cross-sectional view of a PDP according to a tenth exemplary embodiment of the present invention.

Referring to FIG. 13, according to the tenth exemplary embodiment of the present invention, a discharge firing electrode portion 105*a* of a sustain electrode 105 and a discharge firing electrode portion 106*a* of a scan electrode 106 are formed at positions biased toward the address electrode 12.

Figure 14:
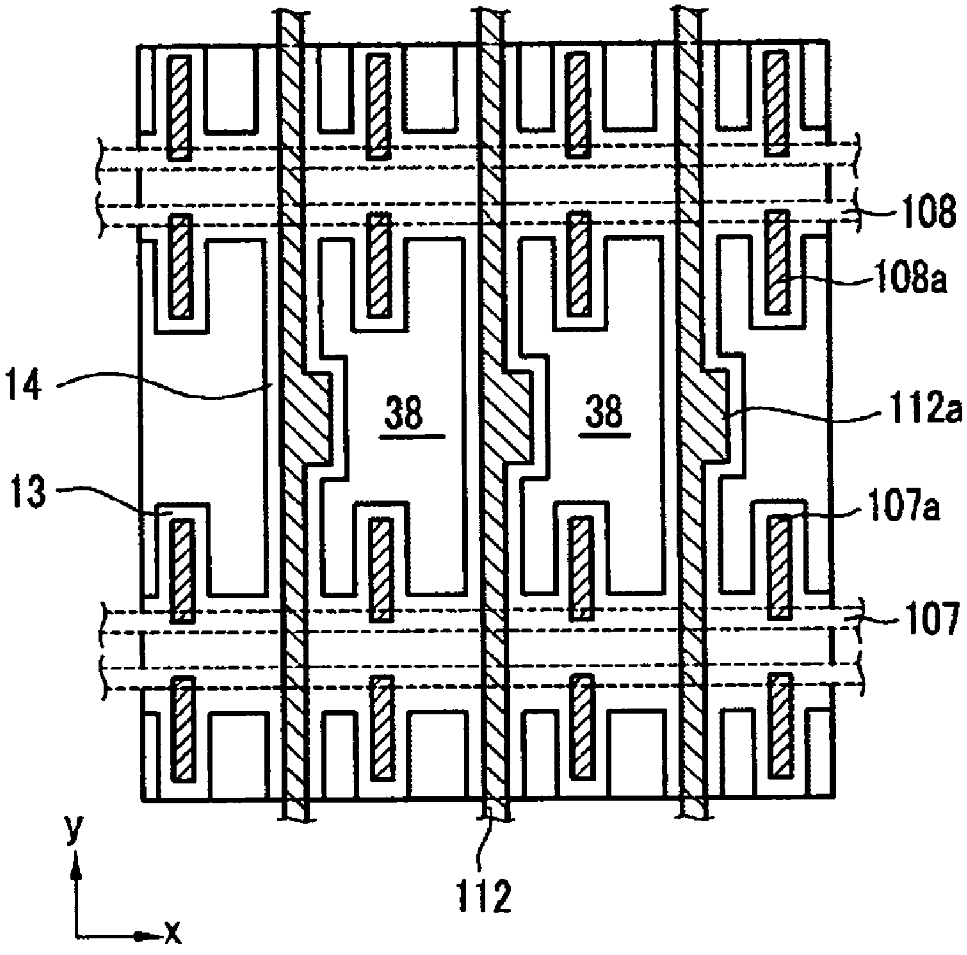
FIG. 14 is a partial cross-sectional view of a PDP according to an eleventh exemplary embodiment of the present invention.

Referring to FIG. 14, according to the eleventh exemplary embodiment of the present invention, a protruding portion 112*a* of an address electrode 112 protrudes less in comparison with other exemplary embodiments. In addition, a discharge firing electrode portion 107*a* of a sustain electrode 107 and a discharge firing electrode portion 108*a* of a scan electrode 108 protrude more in comparison with other exemplary embodiments.

While this invention has been described in connection with what is presently considered to be practical exemplary embodiments, it is to be understood that the present invention is not limited to the disclosed embodiments, but, on the contrary, is intended to cover various modifications and equivalent arrangements included within the spirit and scope of the appended claims.

What is claimed is:

1. A Plasma Display Panel (PDP), comprising:
- first and second substrates arranged facing each other and defining a space therebetween partitioned into at least one discharge cell;
- a phosphor layer arranged in the at least one discharge cell;
- an address electrode arranged along a first direction in the space between the first and second substrates; and
- first and second electrodes electrically insulated from the address electrode and arranged along a second direction crossing the first direction at opposite sides of each of the at least one discharge cells in the space between the first and second substrates;
- wherein at least one of the first and second electrodes includes a plurality of electrode portions that are separate from each other;
- wherein the plurality of electrode portions are arranged a top one another in a third direction perpendicular to the first substrate;
- wherein the plurality of electrode portions comprise:
- a discharge firing electrode portion protruding toward an interior of its respective discharge cell and arranged at a position corresponding to and parallel to the address electrode; and
- at least one sustain electrode portion protruding toward an interior of its respective discharge cell arranged either between the discharge firing electrode portion and the first substrate or between the discharge firing electrode portion and the second substrate;
- wherein a distance between the respective protruding discharge firing electrode portions of the first and second electrodes is less than a distance between the respective protruding sustain electrode portions of the first and second electrodes.

2. The plasma display panel of claim 1, wherein the discharge firing electrode portion protrudes further toward an interior of each discharge cell than the sustain electrode portion.

3. The plasma display panel of claim 1, wherein:
- the at least one sustain electrode portion comprises a plurality of sustain electrode portions arranged either between the discharge firing electrode portion and the first substrate or between the discharge firing electrode portion and the second substrate; and the plurality of electrode portions protrude further toward the interior of a discharge cell corresponding thereto in a stepwise manner from either the sustain electrode portion adjacent to the first substrate or the second substrate to the discharge firing electrode portion.

4. The plasma display panel of claim 1, wherein the discharge firing electrode portion comprises a floating electrode.

5. The plasma display panel of claim 1, wherein the at least one sustain electrode portion is elongated along the second direction.

6. The plasma display panel of claim 5, wherein the at least one sustain electrode portion either is arranged in a striped pattern or includes a protruding portion protruding toward an interior of the each discharge cell.

7. The plasma display panel of claim 5, wherein:

the at least one sustain electrode portion comprises a first side facing the discharge firing electrode portion and a second side opposite to the first side; and the at least one sustain electrode portion in each discharge cell gradually protrudes toward the interior of the each discharge cell from the second side to the first side.

8. The plasma display panel of claim 1, wherein:

the at least one sustain electrode portion is arranged between the discharge firing electrode portion and the first substrate; and the discharge firing electrode portion is arranged facing the second substrate.

9. The plasma display panel of claim 1, wherein:

the at least one sustain electrode portion is arranged between the discharge firing electrode portion and the second substrate; and the discharge firing electrode portion is arranged facing the first substrate.

10. The plasma display panel of claim 1, wherein the at least one sustain electrode portion is respectively arranged between the discharge firing electrode portion and the first substrate and between the discharge firing electrode portion and the second substrate.

11. The plasma display panel of claim 1, wherein the address electrode, the first electrode, and the second electrode are covered by at least one dielectric layer.

12. The plasma display panel of claim 1, further comprising:

a first barrier rib layer arranged adjacent to the first substrate and partitioning a first discharge cell at a side of the first substrate; and a second barrier rib layer arranged adjacent to the second substrate and partitioning a second discharge cell at a side of the second substrate;

wherein the first and second discharge cells cooperatively define one effective discharge cell; and wherein the address electrode and the first and second electrodes are arranged between the first and second barrier rib layers.

13. The plasma display panel of claim 1, wherein the address electrode is commonly shared by adjacent discharge cells along the second direction.

14. The plasma display panel of claim 13, wherein the address electrode comprises a protruding portion protruding toward an interior of one of the adjacent discharge cells.

15. The plasma display panel of claim 14, wherein:

each of the discharge firing electrode portions of the first electrode and the discharge firing electrode portion of the second electrode protrudes toward an interior of a discharge cell corresponding thereto; and the protruding portion of the address electrode protrudes toward a position between the discharge firing electrode portion of the first electrode and the discharge firing electrode portion of the second electrode.

16. The plasma display panel of claim 1, wherein at least one of the plurality of electrode portions comprises a floating electrode.

* * * * *